United States Patent [19]

Shintani et al.

[11] Patent Number: 5,250,338
[45] Date of Patent: Oct. 5, 1993

[54] MAGNETIC RECORDING MEDIUM

[75] Inventors: Masaki Shintani, Kamakura; Kanji Takashima, Yokohama; Koichiro Yamazki, Kawasaki; Toshio Kato, Yamato, all of Japan

[73] Assignee: Victor Company of Japan, Ltd., Yokohama, Japan

[21] Appl. No.: 614,477

[22] Filed: Nov. 16, 1989

[30] Foreign Application Priority Data

Nov. 24, 1989 [JP] Japan .................. 1-305866

[51] Int. Cl.⁵ .............................. G11B 05/00
[52] U.S. Cl. ................................ 428/64; 428/65; 428/336; 428/611; 428/666; 428/667; 428/680; 428/687; 428/694 SG; 428/900; 428/928; 428/694 BP
[58] Field of Search ............ 428/64, 65, 336, 611, 428/667, 687, 694, 900, 928, 666, 680, 695

[56] References Cited

U.S. PATENT DOCUMENTS

| | | | |
|---|---|---|---|
| 4,652,499 | 3/1987 | Howard | 428/641 |
| 4,735,840 | 4/1988 | Hedgcoth | 428/65 |
| 4,749,628 | 6/1988 | Ahlert et al. | 428/660 |
| 5,063,120 | 11/1991 | Edmonson et al. | 428/694 |

FOREIGN PATENT DOCUMENTS 58-77024  5/1983  Japan .

Primary Examiner—Stevan A. Resan
Attorney, Agent, or Firm—Lowe, Price, LeBlanc & Becker

[57] ABSTRACT

A magnetic recording medium which comprises a non-ferromagnetic substrate having two types of defects or irregularities formed thereon along a circumferential direction with different center line average roughnesses, on which a non-ferromagnetic metal film and a Co alloy ferromagnetic film are formed by sputtering in this order. The ferromagnetic film has such a crystal structure that a (200) plane is parallel to the surface of the substrate and a <011> orientation is toward a circumferential direction. Thus, the C axis of the ferromagnetic film is oriented toward the circumferential direction of the substrate. A method for fabricating the magnetic recording medium is also described wherein the distance between the substrate and the respective targets for the non-ferromagnetic metal film and the Cr alloy ferromagnetic film is set within a mean free path of sputtered particles and the substrate is heated to a temperature of from 150° to 300° C. when these films are formed by sputtering.

5 Claims, 9 Drawing Sheets

M

M c AXIS

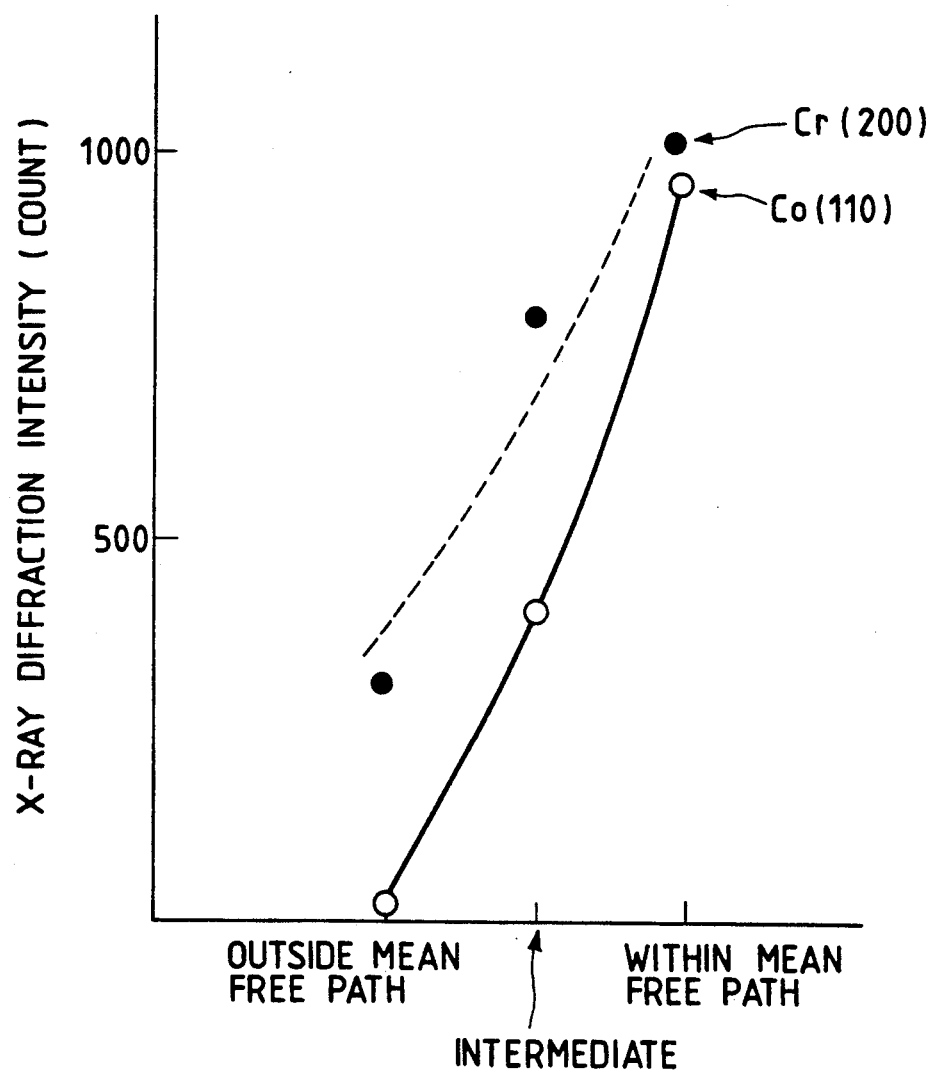

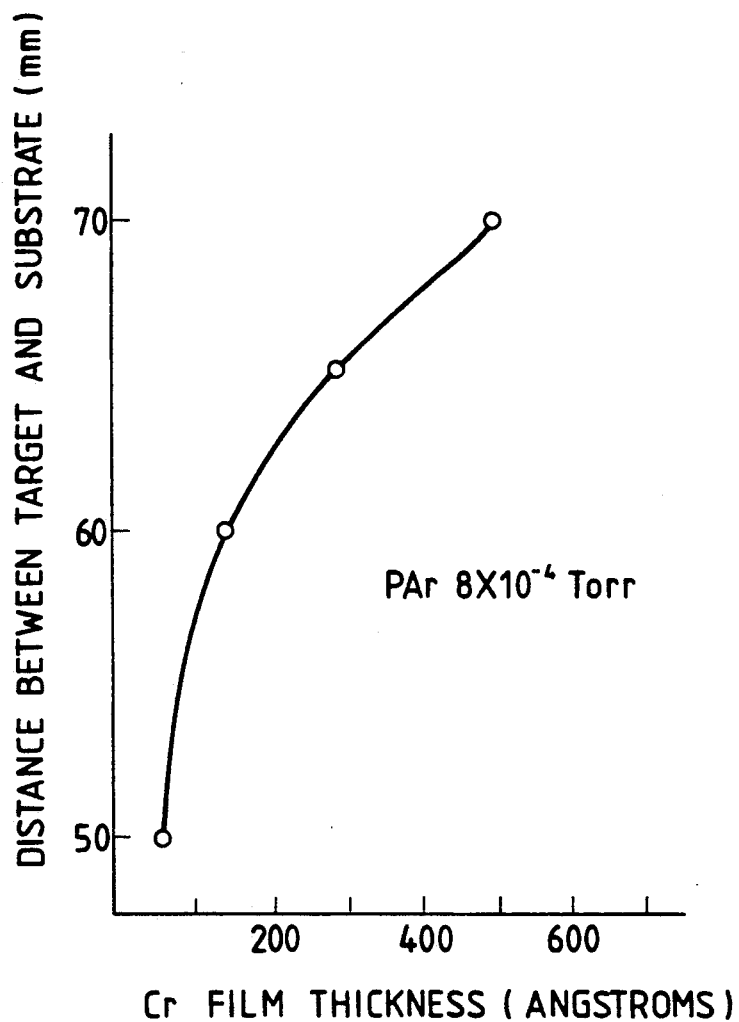

c AXIS IN THE CIRCUMFERENTIAL DIRECTION c AXIS IN THE ISOTROPIC DIRECTION

MAGNETIC RECORDING MEDIUM

BACKGROUND OF THE INVENTION

1. Field of the Invention

This invention relates to magnetic recording mediums of the metallic film-built type and a method for fabricating such mediums.

2. Description of the Prior Art

A recent trend toward high recording density of magnetic disks entails wide utility of continuous thin film types of magnetic recording mediums rather than coating types of magnetic recording mediums wherein magnetic powders such as γ-ferrite are dispersed in organic binders. The thin film-built magnetic recoding mediums have a number of advantages in that they have a high coercive force and can be formed very thin by plating and sputtering techniques. Accordingly, studies have been made on such continuous thin film-type magnetic recording mediums and their fabrication.

In particular, magnetic recording mediums of the type using a Co alloy ferromagnetic film formed by sputtering have been extensively made for achieving high density recording. For instance, Japanese Kokai No. 58-77024 describes a magnetic recording medium which is obtained by forming a Cr film on a non-ferromagnetic substrate to form a non-ferromagnetic metal film on which a Co alloy ferromagnetic film is formed by sputtering.

We found that when a magnetic disk having a Co alloy ferromagnetic film formed by the sputtering as set forth above is used for high density recording, the magnetic anisotropy of the Co alloy and particularly, the magnetic anisotropy of the crystals and the direction of orientation of the crystals relative to the recording plane of the magnetic disk greatly influence the magnetic characteristics of the disk, e.g. residual magnetization characteristics along the tracking and radial directions, a squareness ratio and a coercive force.

In these known magnetic recording disks, the magnetic anisotropy and the direction of orientation of crystals of the Co alloy have not been satisfactorily controlled.

For magnetic recording at high density and at high output power and reproduction of magnetic recording signals, the control of the Co alloy with respect to the magnetic anisotropy and the direction of orientation of the crystals is one of problems to solve.

SUMMARY OF THE INVENTION

It is accordingly an object of the invention to provide a magnetic recording medium of the film-built type which overcomes the drawbacks of the prior counterparts and wherein a ferromagnetic recording film of the medium has an axis of easy magnetization oriented along an in-plane circumferential direction.

It is another object of the invention to provide a magnetic recording medium of the type whose ferromagnetic film has a great ratio in orientation between the radial direction and the circumferential direction, so that the magnetic characteristics such as residual magnetization, squareness ratio and coercive force are greater in the in-plane circumferential direction than in the radiation direction with good resolving power and output characteristics.

It is a further object of the invention to provide a method for fabricating a magnetic recording medium of the type mentioned above.

According to one embodiment of the invention, there is provided a magnetic recording medium which comprises a non-ferromagnetic substrate, a non-ferromagnetic metal film formed on the non-ferromagnetic substrate, and a Co alloy ferromagnetic film having a crystal structure whose axis of easy magnetization is oriented in an in-plane circumferential direction serving as a recording layer and formed on the non-ferromagnetic metal film.

Preferably, the non-ferromagnetic metal film is a 50 to 700 angstrom thick Cr film which has such a crystal structure as having a (200) plane parallel to the surface of the substrate and a <011> orientation directed toward the circumferential direction and the Co alloy ferromagnetic film has a crystal structure whose (110) plane is parallel to the surface of the substrate and whose orientation <001> tends toward the circumferential direction.

The substrate used should preferably be thermally treated and subjected to texturing treatment to have two types of defects or irregularities formed along a circumferential direction so that two center line average roughnesses, Ra, of the two types of defects are, respectively, approximately 150 angstroms and from 40 to 50 angstroms.

According to another embodiment of the invention, there is also provided a method for fabricating a magnetic recording medium which comprises:

providing a non-ferromagnetic substrate of a disk form;

subjecting the non-ferromagnetic substrate to texturing treatment so that the substrate is provided with two types of irregularities on a surface thereof along a circumferential direction of the substrate, one type of irregularities having a center line average roughness of from 40 to 50 angstroms, the other type of irregularities having a center line average roughness of approximately 150 angstroms;

forming a Cr non-ferromagnetic film on the substrate by sputtering; and forming a Co alloy ferromagnetic film on the Cr non-ferromagnetic film by sputtering, wherein when the Cr non-ferromagnetic film and the Co alloy ferromagnetic film are, respectively, formed, the distance between the respective targets for the Cr non-ferromagnetic film and the Co alloy ferromagnetic film and the substrate is set within a mean free path of sputtered particles and the substrate is heated at a temperature of from 150° to 300°C.

BRIEF DESCRIPTION OF THE DRAWINGS

FIG. 6 is a graph showing the crystallinity of a Cr film and a Co alloy ferromagnetic film in relation to the distance between a non-ferromagnetic substrate and the respective targets being sputtered;

FIG. 8 is a graph showing the relation between the distance of the target and the substrate and the thickness of a Cr film formed by sputtering;

DETAILED DESCRIPTION AND EMBODIMENTS OF THE INVENTION

Figure 1:
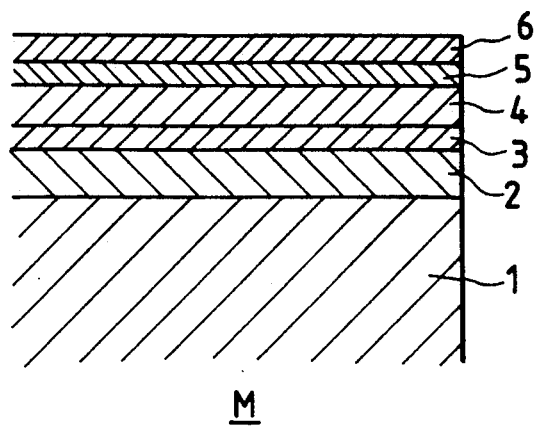
FIG. 1 is a schematic sectional view of part of a magnetic disk according to the invention.

According to the invention, the magnetic recording medium includes a non-ferromagnetic substrate on which a non-ferromagnetic metal film and a Co alloy ferromagnetic film are formed in this order. The invention is characterized in that the ferromagnetic film has an axis of easy magnetization in an in-plane circumferential direction. In order to provide such a ferromagnetic film, the substrate is subjected to texturing treatment to make defects or irregularities along the circumferential direction of the substrate. By the presence of the defects, the Co alloy crystals are oriented along the circumferential direction when the Co alloy ferromagnetic film is formed by sputtering. The Co alloy crystals are epitaxially grown according to the crystal plane and orientation of a non-ferromagnetic metal film formed on the substrate so that the axis of easy magnetization is oriented in an in-plane circumferential direction.

Prior to the formation of the non-ferromagnetic metal film, the non-ferromagnetic substrate is subjected to thermal treatment in vacuum to eliminate contaminants such as C and O from the substrate. It is preferred that the non-ferromagnetic substrate is subjected to texturing treatment to provide two types of defects or irregularities having center line average roughnesses, Ra, of approximately 150 angstroms and from 40 to 50 angstroms. The defects having a center line average roughness of from 40 to 50 angstroms facilitates plane orientation of the crystals in the ferromagnetic metal film toward the circumferential direction of the substrate, resulting in the plane orientation of Co alloy crystals in the circumferential direction of the substrate. On the other hand, the defects having a center line average roughness of 150 angstroms can improve head touch properties to the magnetic recording medium.

In the method of the invention, the distance between the non-ferromagnetic substrate and the respective targets for the non-ferromagnetic metal film and the Cr alloy ferromagnetic film is set within a mean free path of sputtered particles, and the substrate is heated at a temperature of 150° to 300° C. to form the non-ferromagnetic film and the Co alloy ferromagnetic film on the substrate in this order. By this, the metal film is reliably formed to have a crystal structure which has a (200) plane parallel to the surface of the substrate and a <011> orientation toward the circumferential direction. Moreover, the Co alloy ferromagnetic film is also formed as having such a crystal structure whose (110) plane is parallel to the surface of the substrate and whose <001> orientation is toward the circumferential direction.

Since the magnetic recording medium of the invention has a great orientation ratio in the C axis between the circumferential direction and the radial direction of the magnetic recording medium in the form of a disk, the magnetic characteristics such as residual magnetization, squareness ratio and coercive force become larger in the in-plane circumferential direction than in the radial direction of the medium, with better resolving power and output power.

When the non-ferromagnetic metal film is made of Cr and has a thickness ranging from 50 to 700 angstroms while the crystal plane of (200) is made parallel to the surface of the substrate and the orientation of <011> directed toward the circumferential direction, the Co alloy ferromagnetic film is more likely to be formed as having such a crystal structure that the (110) plane is parallel to the surface of the substrate and the <001> orientation is directed toward the circumferential direction. As a result, the orientation ratio to the radial direction becomes larger with better resolving powder and output power.

Reference is now made to the accompanying drawings and particularly to FIG. 1. In FIG. 1, there is shown a magnetic recording medium M according to one embodiment of the invention.

The magnetic recording medium M includes a non-magnetic metal support 1 such as an Al alloy and a hard non-magnetic NiP film 2 formed on the substrate such as by plating. Subsequently, a metal thin film 3 and a Co alloy ferromagnetic film 4 are successively formed on the NiP film 2 by sputtering. The metal for the film 3 may be Cr, Ti, CrNi or the like and the Co alloy may be CoCrNi alloys, CoCrTa alloys or the like. If necessary, a protective film 5 such as of C and a lubricating film 6 such as fluorocarbon resins may be formed on the Co alloy ferromagnetic film 4 in this order. The magnetic recording medium M may be a magnetic disk.

The NiP film 2 ensures impact properties sufficient for head touch to the magnetic recording medium, and the protective film 5 and the lubricant film 6 both take part in the wear resistance of the head and the disk medium.

The NiP film constituting a non-ferromagnetic substrate along with the support 1 is subjected to texturing treatment on the surface thereof and thus formed with a multitude of defects. The defects are of two types, of which defects of one type have a center line average roughness, Ra, of approximately 150 angstroms in the circumferential direction which is a tracking direction of the magnetic disk. Another type has a center line average roughness of from 40 to 50 angstroms. For the formation of the two types of defects, the texturing treatment is effected, for example, by using two types of abrasive-coated tapes having different roughnesses. More particularly, the NiP film is first rubbed with one of the tapes having a roughness of #3000 to #6000 to give defects having a roughness, Ra, of approximately 150 angstroms, followed by rubbing with an abrasive-coated tape with a roughness of #8000 to 10,000 to give defects with a roughness, Ra, of 40 to 50 angstroms on the surface of the NiP film. The abrasive-coated tapes may be those which include $Al_2O_3$ or SiC abrasive grains bound with a binder on a polyester tape. For the texturing, the two types of tapes are, respectively, forced against the substrate, which is being rotated at about 100 to 600 r.p.m., at a pressure of up to 1.5 kg/cm$^2$, thereby attaining a desired degree of the texturing treatment.

The line center average roughness, Ra, of approximately 150 angstroms on the surface of the Nip film can solve the problem that a strong attraction force between a magnetic head and the disk is produced so that the head is not floated as would occur when the NiP film 2 is smooth and flat on the surface thereof. On the other hand, the center line average roughness, Ra, of from 40 to 50 angstroms causes the (200) plane of Cr crystals parallel to the surface of the non-ferromagnetic substrate and tends the <011> orientation toward the circumferential direction of the non-ferromagnetic substrate when the Cr film 3 is formed.

Accordingly, the Cr film 3 formed on the surface of the NiP film 2 has such a crystal structure that the (200) plane is parallel to the surface of the non-ferromagnetic substrate and the <011> orientation is in the circumferential direction of the non-ferromagnetic substrate.

Figure 2:
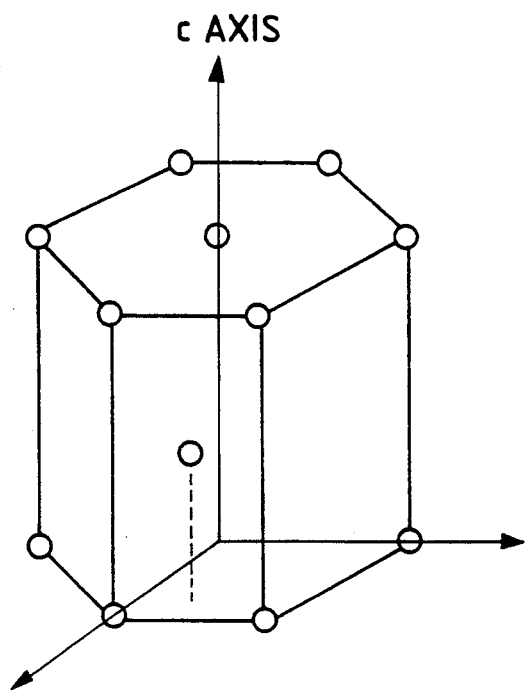
FIG. 2 is a schematic view illustrating a crystal structure of a Co alloy used in the magnetic disk of the invention.
Figure 3:
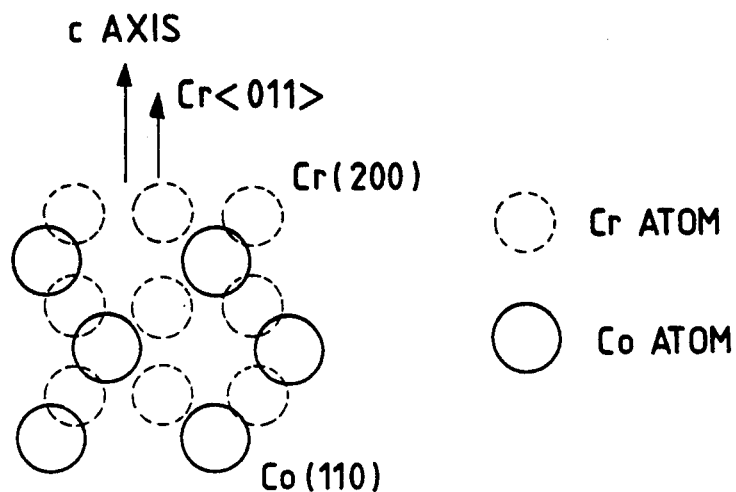
FIG. 3 is an illustrative view of the epitaxial relation between the Cr atoms in a Cr film and a Cr alloy in the Cr alloy ferromagnetic film.

This, in turn, results in the Co alloy ferromagnetic film 4 formed on the Cr film as having the (110) plane parallel to the surface of the non-ferromagnetic substrate and the <001> orientation, i.e. the c axis as shown in FIG. 2, which is the axis of easy magnetization, toward the circumferential direction of the non-ferromagnetic substrate. This indicates that, as shown in FIG. 3, the (200) plane of the Cr film 3 and the (110) plane of the Co alloy ferromagnetic film 4 are in the epitaxial relationship, i.e. the Co alloy ferromagnetic film 4 is expitaxially grown on the Cr film 3.

The magnetic recording medium having such an arrangement as stated above is fabricated in the following manner.

First, a support 1 made, for example, of an Al alloy is formed with the NiP film 2 by plating to provide a non-ferromagnetic substrate. The NiP film 2 is subjected to texturing treatment as described before to make two types of defects along the circumferential direction.

Next, the NiP film 2 is heated at approximately 300° C. in vacuum to remove contaminants and oxygen from the surface of the NiP film. This is because if organic matters are deposited on the surface of the NiP film or the film surface is oxidized, the growth of the Cr crystals impeded when the Cr film 3 is formed. The impeding factors of the growth of the Cr crystals are mainly C, H and O.

Figure 4:
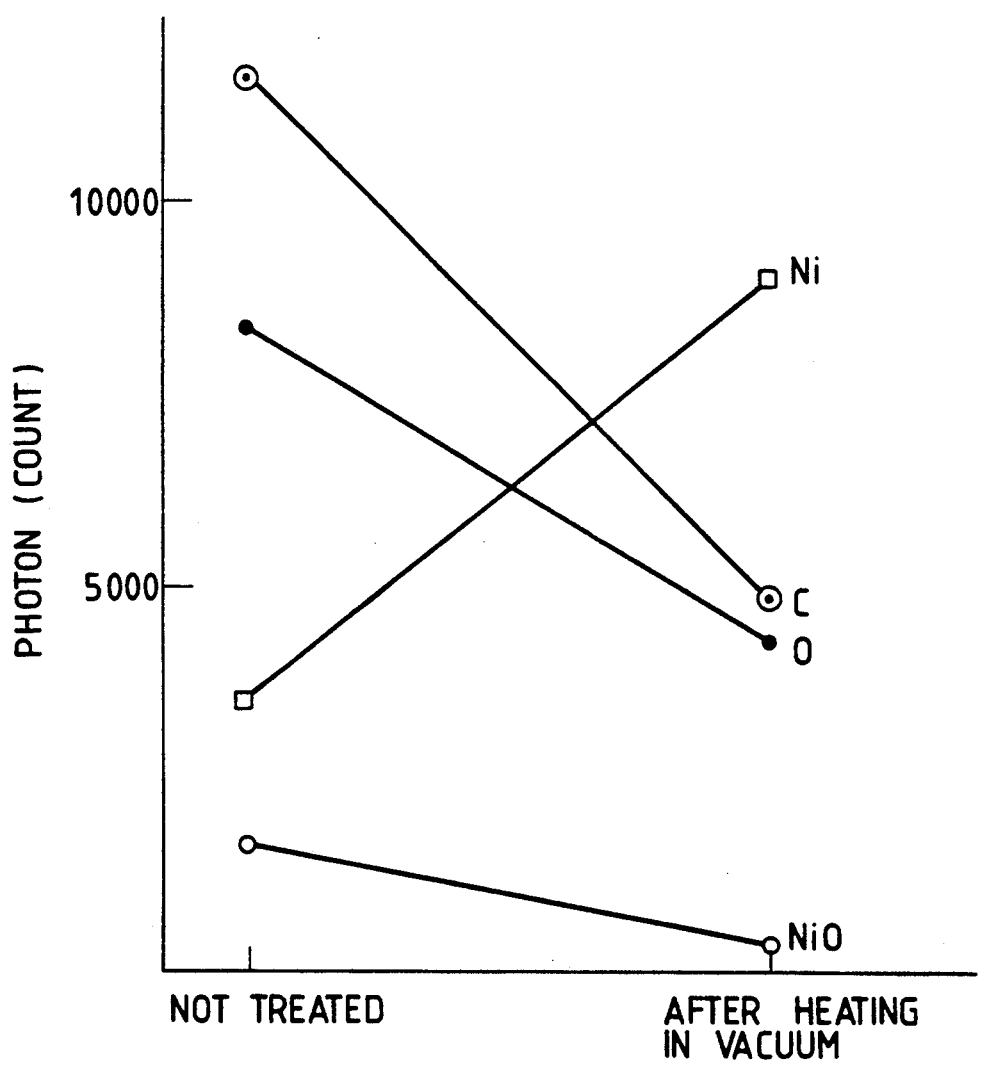
FIG. 4 is a graph showing the results of measurement by X-ray diffraction of C and O on the surface of a non-ferromagnetic film on a non-ferromagnetic substrate prior to and after thermal treatment in vacuum.

In FIG. 4, there are shown the results of the X-ray photon spectrometry, wherein there are counted a number of photons generated upon irradiation of an X-ray on the film, prior to and after the thermal treatment of the NiP film in vacuum, revealing that most oxygen atoms are present by bonding with Ni of the NiP film 2 and the carbon and oxygen atoms can be removed by the thermal treatment in vacuum.

The thermal treatment in vacuum of the NiP film 2 is ordinarily performed in a vacuum heating chamber connected to a sputtering chamber through a valve.

Subsequently, the valve is opened so that the non-ferromagnetic substrate which has been thermally treated in vacuum is transferred from the vacuum heating chamber to the sputtering chamber wherein a Co target used to form the Cr film 3 and a Co alloy target used to form the Co alloy ferromagnetic film are placed in position. In the sputtering chamber, the positions of the non-ferromagnetic substrate and the respective targets have been preliminarily set in such a way that the distance between the surface of the NiP film 2 and the respective targets in the sputtering chamber is within a mean free path of sputtered particles. The reason why the distance is set within a mean free path of sputtered particles is as follows.

Figure 5:
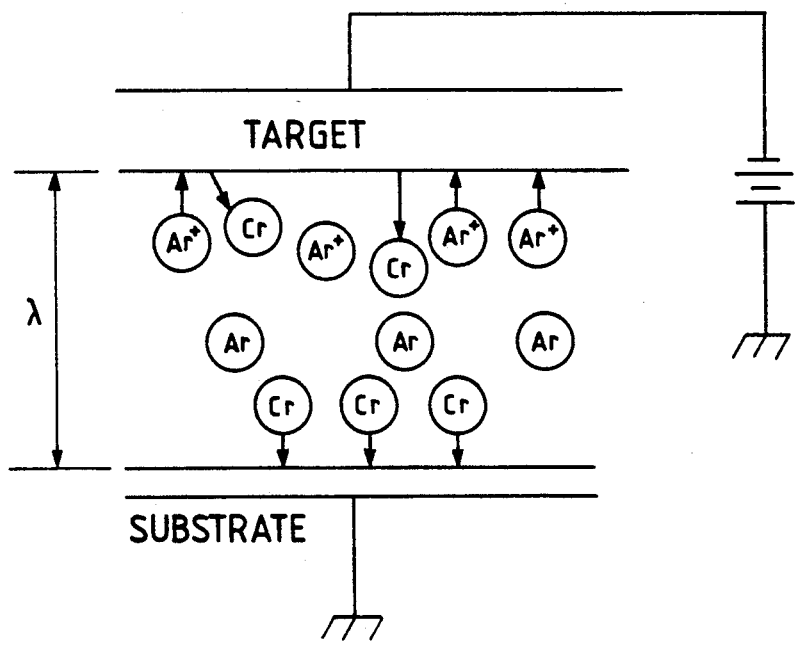
FIG. 5 is a schematic illustrative view of a sputtering state of Cr sputtered particles and atmospheric Ar for forming a Cr film by sputtering.

The case where the Cr film 3 is formed in an atmosphere of Ar by a DC magnetron sputtering method is described. As shown in FIG. 5, sputtered particles flied out from the target by collision of Ar$^+$ions reach the substrate surface while colliding with Ar molecules left in the atmosphere. Upon the collision with the Ar molecules in the atmosphere, the energy of the sputtered particles is greatly lost, thereby causing the crystallinity of the Cr film to be lost. It is assumed that when the distance between the substrate and the target is set within a mean free path, $\lambda$, the sputtered particles fly without collision, so that the energy loss of the particles can be avoided, thereby enhancing the crystallinity of the Cr film 3. The mean free path, $\lambda$, is given by the following equation (1)

$$\lambda \approx 10^{-2}/P_{Ar} \quad (1)$$

wherein the unit of $\lambda$ is indicated by cm, and $P_{Ar}$ is a pressure of Ar by Torr. As will be apparent from the above equation, when the pressure of Ar, $P_{Ar}$, in the sputtering chamber is in the range of $10^{-2}$ to $10^{-3}$ Torr, the distance between the substrate and the target can be set within a range of from 10 to 100 mm in order to attain good crystallinity of the Cr film 3.

The built-up films of the Cr film 3 and the Co alloy ferromagnetic film 4 which were formed such that the distance between the substrate and the respective targets were within and outside the mean free path, $\lambda$, of sputtered particles according to the equation (1). The results of the X-ray diffraction measurement of the built-up films are shown in FIG. 6.

The results of FIG. 6 demonstrate that when the distance between the substrate and the respective targets is within the mean free path, the diffraction intensities of the X-ray from the (200) plane of Cr and the (110) plane of Co are greater than those obtained outside the mean free path, giving evidence that the above assumption is correct.

Figure 7:
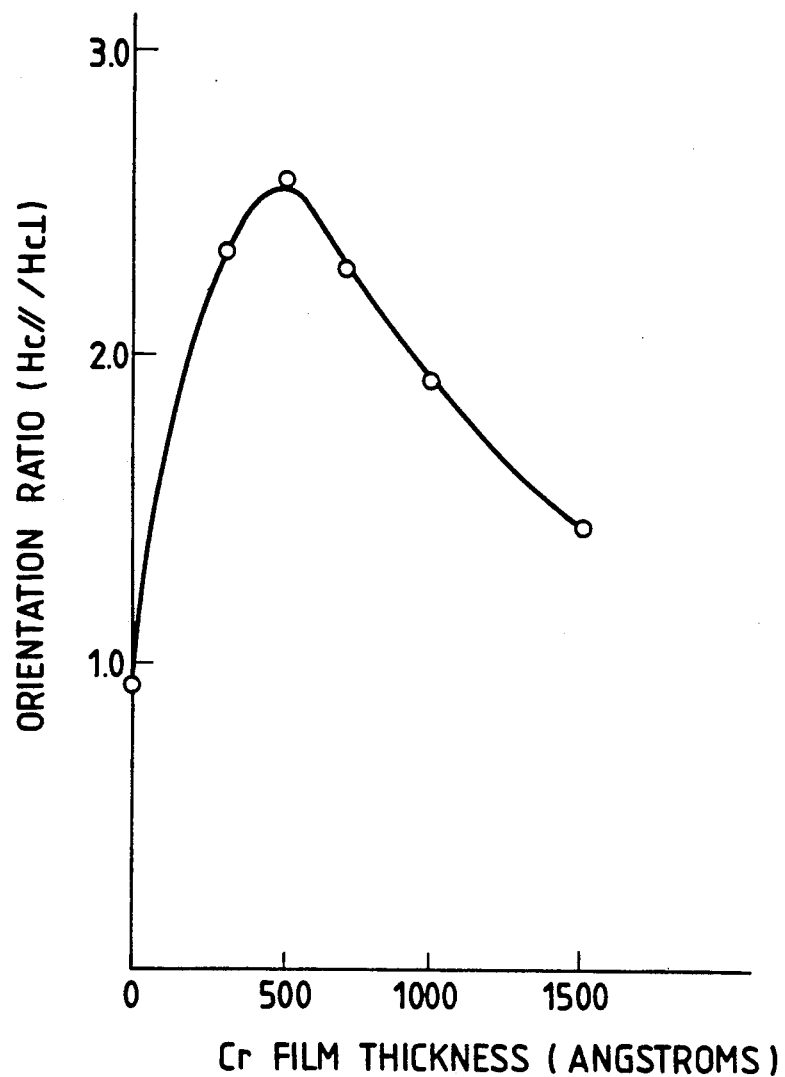
FIG. 7 is a graph showing the relation between the thickness of a Cr film formed by sputtering and a ratio in orientation of the circumferential direction and the radial direction of a disk with respect to a Co alloy of a Co alloy ferromagnetic film formed on the Cr film.

The ratio in orientation of the Co alloy ferromagnetic film 4 between the circumferential direction, Hc//, and the radial direction, Hc⊥, has a great relation with the thickness of the Cr film as shown in FIG. 7. The Cr film 3 has an optimum thickness at which the orientation ratio of the Co ferromagnetic film 4 is maximized. This is considered for the following reason. When the thickness of the Cr film 3 is small, the film 3 grows according to the directional property of the defects by texturing. However, as the thickness increases, the (110) plane along which the Cr film 3 is likely to orient may grow, or the Cr film may become isotropic. Accordingly, the ratio of the (200) plane of the Cr film 3 which serves to orient the Co alloy ferromagnetic film 4 as described before is reduced. The optimum thickness of the Cr film 3 varies in relation to the distance between the substrate and the target (of Cr と 基 板 と ター). There is shown the relation between the optimum thickness of the Cr film 3 and the target-substrate distance in case where the pressure of Ar, $P_{Ar}$, at the time of sputtering is at $8 \times 10^{-4}$ Torr. As will be seen from the results of FIG. 8, the optimum thickness becomes smaller with the target-substrate distance being smaller than the mean free path. Taking the mean free path into account, an appropriate thickness of the Cr film is in the range of from 50 to 700 angstroms.

While the substrate is heated in the sputtering chamber wherein the distance between the substrate and the target is set as set forth above, the sputtering is performed. If the surface temperature of the substrate is low, the growth of the crystals is unlikely to occur. For the formation of the Cr film 3, Cr crystals grow satisfactorily at 150° C. or higher. However, over 300° C., the NiP film 2 starts to be magnetized. Thus, magnetic recording mediums of good quality cannot be obtained. Accordingly, the surface temperature of the substrate is in the range of from 150° to 300° C.

The above is true of the case where the Co alloy film 4 is formed.

As described above, the Cr film 3 and the Co alloy ferromagnetic film 4 are successively formed on the NiP film 2. Subsequently, the protective film 5 and the lubricating film 6 may be successively formed according to any known technique to obtain the magnetic recording medium shown in FIG. 1.

The thus obtained magnetic recording medium or disk has differently shaped magnetic hystereses when a magnetic field is applied in the circumferential or tracking direction and in the radial direction. In FIG. 9, there are shown hysteresis curves of the magnetic recording medium of the invention wherein the c axis of the Co alloy in the film oriented in the circumferential direction and a known magnetic recording medium wherein the c axis is isotropic.

It will be noted that the Cr film 3 is formed in a thickness of 500 angstroms and the Cr alloy used is a CoCrTa alloy and is formed in a thickness of 500 angstroms in the medium of the invention and the known medium. With the medium of the invention, the NiP film is subjected to texturing treatment using two types of abrasive-coated papers to form irregularities with different center line average roughnesses on the NiP film as stated before. In the known medium, the NiP film is not treated and is smooth on the surface thereof.

Figure 9A:
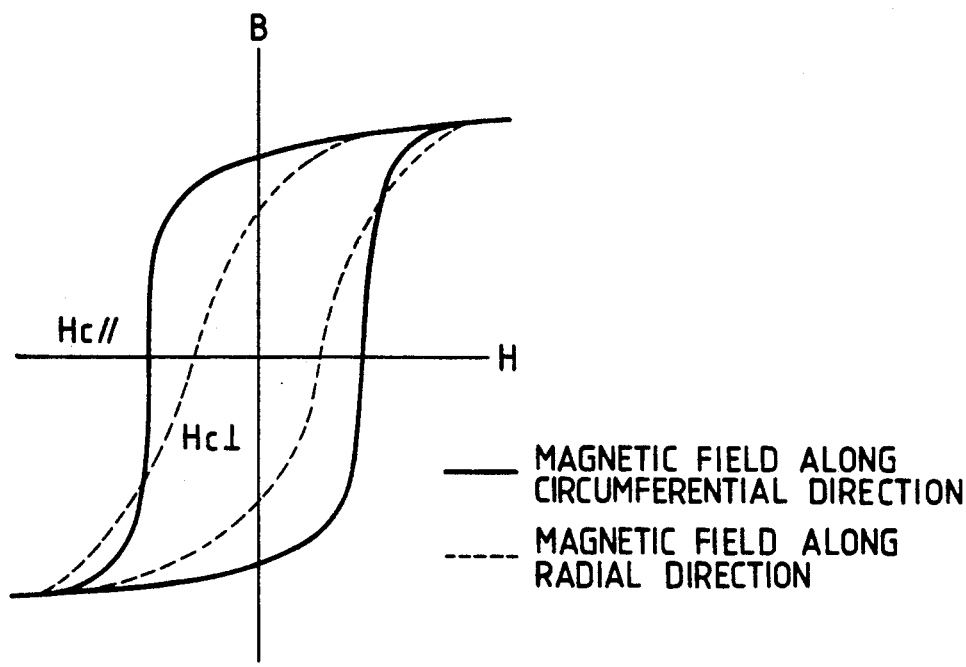
FIGS. 9a and 9b are, respectively, graphs of magnetic hystereses of a magnetic disk of the invention and a known magnetic disk.
Figure 9B:
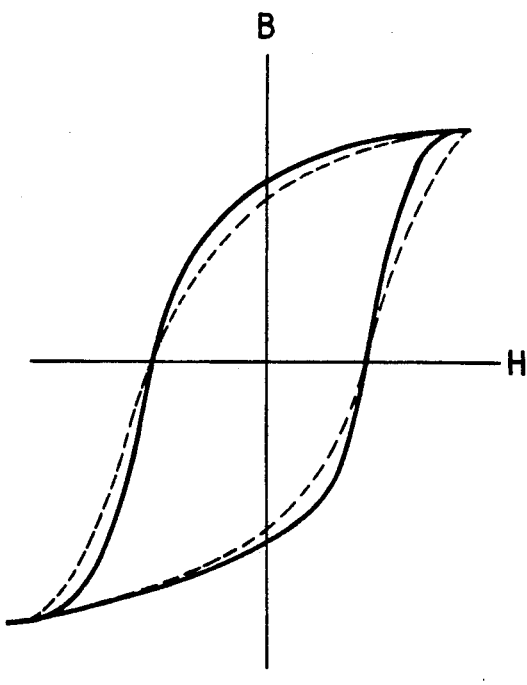

As will be seen from the results of FIG. 9, the magnetic recording medium of the invention exhibits a greater coercive force when a magnetic field is applied along the circumferential direction than that obtained when the magnetic field is applied along the radial direction, with the hysteresis curves being significantly different from each other (FIG. 9a). In contrast, with the known magnetic recording medium for comparison, the coercive forces of both cases are substantially the same with the shapes of the curves being similar (FIG. 9b).

The magnetic recording mediums of the invention and for comparison are subjected to measurements of magnetic characteristics and the orientation ratio of the Co alloy. The results are shown in Table below.

TABLE

| Saturation Magnetization (emu/cc) | Residual Magnetization (emu/cc) | | Squareness Ratio (Rs) | | Coercive Force (Oe) | | Orientation Ratio |
|---|---|---|---|---|---|---|---|
| | C* | R** | C | R | C | R | C/R |
| Medium Of Invention: | | | | | | | |
| 713 | 637 | 306 | 0.89 | 0.44 | 1400 | 740 | 1.89 |
| Medium For Comparison: | | | | | | | |
| 713 | 598 | 446 | 0.82 | 0.61 | 1210 | 980 | 1.23 |

Note:
*C indicates a circumferential direction.
**R indicates a radial direction.

The results of the above table reveal that the medium of the invention is better than the medium for comparison with respect to the orientation of the c axis along the circumferential direction. Although the saturation magnetizations are equal to each other, the residual magnetization, squareness ratio and coercive force of the medium of the invention are higher in the circumferential direction and lower in the radial direction than those of the medium for comparison.

In the same manner as stated above, different magnetic recording mediums were made. In one medium, the NiP film was made with defects by texturing to give a center line average roughness, Ra, of from 40 to 50 angstroms. In the other medium, no defects were made on the NiP film. These mediums were subjected to measurement of the coercive force, squareness ratio and orientation ratio. The results are shown in FIG. 10.

Figure 10:
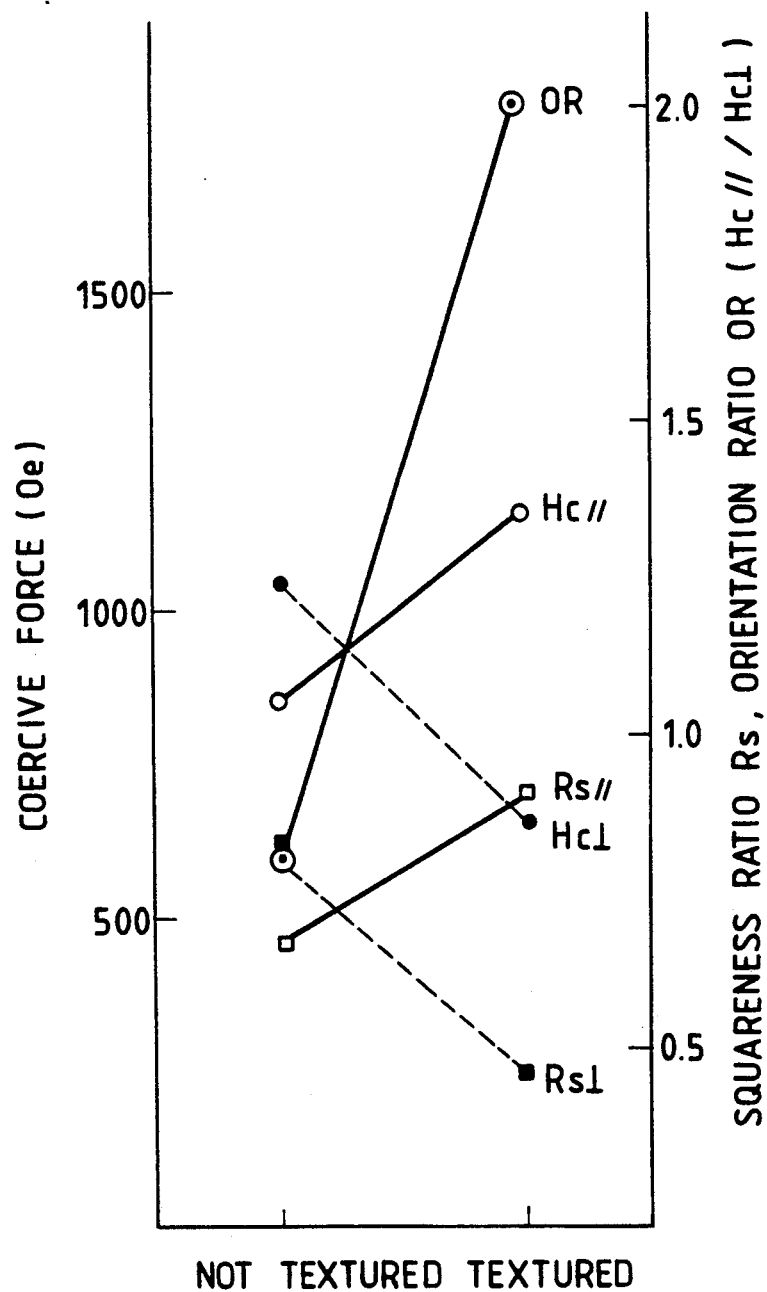
FIG. 10 is a graphical representation of the coercive force, the squareness ratio and the orientation ratio of a Co alloy in a Co alloy ferromagnetic film between the circumferential direction and the radial direction of a disk.

As shown in FIG. 10, the medium of the invention wherein the NiP film was subjected to the texturing treatment has an orientation ratio in the C axis between the circumferential direction and the radial direction of the medium greater than the case where the NiP film was not subjected to the texturing treatment. Moreover, the coercive force and the squareness ratio are relatively greater in the circumferential direction of the disk than in the radial direction.

Figure 11A:
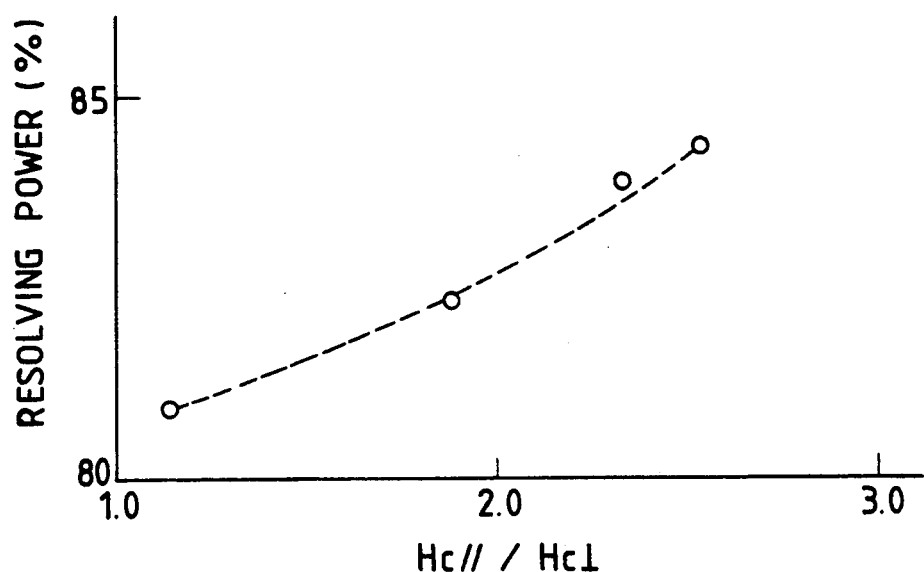
FIGS. 11a and 11b are, respectively, graphical representations of the resolving power and the output of a magnetic disk in relation to the orientation ratio.
Figure 11B:
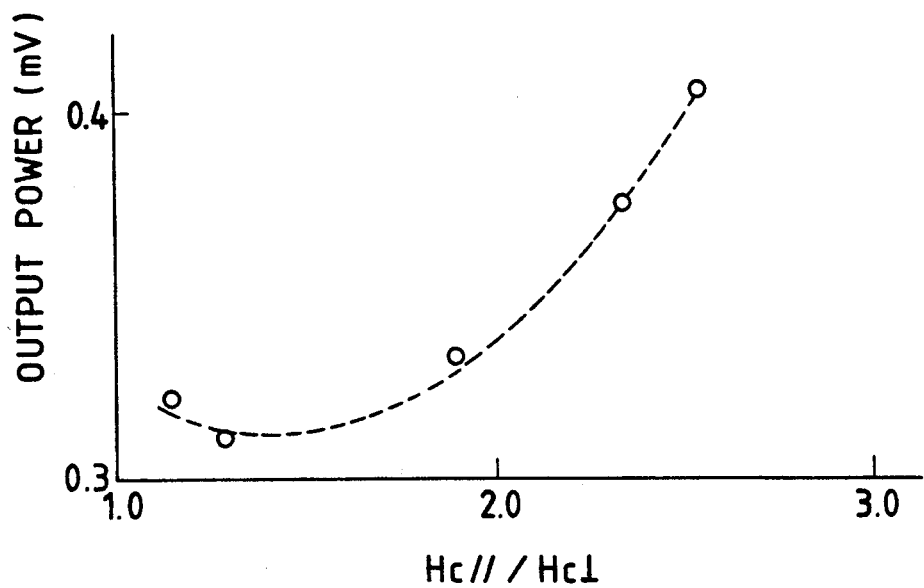

FIG. 11a shows the relation between the orientation ratio in the C axis and the resolving power and FIG. 11b shows the relation between the orientation ratio and the output power. From the figures, it will be seen that the resolving power and the output power increase with an increasing orientation ratio.

Since the magnetic recording medium of the invention has a larger orientation ratio in the C axis between the circumferential direction and the radial direction of the medium than known counterparts, the results of FIGS. 11 a and 11b give evidence that the magnetic recording medium of the invention has good resolving power and the output power.

What is claimed is:

1. A magnetic recording medium which comprises a non-ferromagnetic substrate of a disk form, a non-ferromagnetic metal film formed on the non-ferromagnetic substrate, and a Co alloy ferromagnetic film having a crystal structure whose axis of easy magnetization is oriented in an in-plane circumferential direction serving as a recording layer and formed on the non-ferromagnetic metal film, wherein said substrate has two different irregularities on the surface along the circumferential direction, the first irregularity having a center line average roughness of about 150 angstroms, the second having a center line average roughness of from 40 to 50 angstroms, and wherein said non-ferromagnetic metal film is a Cr film having a thickness of from 50 to 700 angstroms and having a crystal structure characterized in that the (200) plane of the crystals is parallel to the surface of the substrate, said crystals further having a <011> orientation directed toward the circumferential direction; and said Co alloy ferromagnetic film has a crystal structure characterized in that the (100) plane of the crystals is parallel to the surface of the substrate, said crystals further having a <001> orientation directed toward the circumferential direction.

2. The magnetic recording medium according to claim 1, wherein said non-ferromagnetic substrate includes a non-magnetic metal support and an NiP film formed on said non-magnetic metal support.

3. The magnetic recording medium according to claim 1, further comprising a protective film and a lubricating film formed on the Co alloy ferromagnetic film in this order.

4. The magnetic recording medium according to claim 1, wherein said substrate is subjected to thermal treatment in a vacuum to eliminate any contaminant including oxygen from an outer surface thereof.

5. A magnetic recording medium which comprises:
a non-ferromagnetic substrate of a disk form,
a non-ferromagnetic metal film formed on the non-ferromagnetic substrate, and
a ferromagnetic metal film formed on the non-ferromagnetic film,
wherein said non-ferromagnetic metal film is a Cr film having a crystal structure characterized in that the (200) plane of the crystals is parallel to the surface of the substrate, said crystals further having a <011> orientation directed toward the circumferential direction; and
said ferromagnetic film is a Co alloy ferromagnetic film having a crystal structure characterized in that the (110) plane of the crystals is parallel to the surface of the substrate, said crystals further having a <001> orientation directed toward the circumferential direction,
wherein said substrate has two different irregularities on the surface along the circumferential direction, the first irregularity having a center line average roughness of about 150 angstroms, and the second irregularity having a center line average roughness of from 40 to 50 angstroms.

* * * * *

UNITED STATES PATENT AND TRADEMARK OFFICE
CERTIFICATE OF CORRECTION

PATENT NO. : 5,250,338
DATED : October 5, 1993
INVENTOR(S) : Masaki Shintani et al It is certified that error appears in the above-indentified patent and that said Letters Patent is hereby corrected as shown below:

On the title page, please delete the inventor's names and insert the following:

--[75] Inventors: Masaki Shintani, Kamakura, Kanji Takashima, Yokohama; Koichiro Yamazaki, Kawasaki; Toshio Kato, Yamato, all of Japan--

Please delete section [22] and insert the following:

--[22] Filed: Nov. 16, 1990--

Signed and Sealed this

Nineteenth Day of April, 1994

Attest:

BRUCE LEHMAN

*Attesting Officer*  *Commissioner of Patents and Trademarks*